(12) United States Patent
Jung et al.

(10) Patent No.: US 11,474,237 B2
(45) Date of Patent: Oct. 18, 2022

(54) METHOD FOR RETRIEVAL OF LOST RADIAL VELOCITY IN WEATHER RADAR, RECORDING MEDIUM AND DEVICE FOR PERFORMING THE METHOD

(71) Applicant: KOREA METEOROLOGICAL ADMINISTRATION, Seoul (KR)

(72) Inventors: Sung-Hwa Jung, Seoul (KR); Soyeon Park, Seoul (KR); Kwang-Ho Kim, Anyang-si (KR)

(73) Assignee: KOREA METEOROLOGICAL ADMINISTRATION, Seoul (KR)

( * ) Notice: Subject to any disclaimer, the term of this patent is extended or adjusted under 35 U.S.C. 154(b) by 0 days.

(21) Appl. No.: 17/348,473

(22) Filed: Jun. 15, 2021

(65) Prior Publication Data

US 2022/0018956 A1    Jan. 20, 2022

(30) Foreign Application Priority Data

Jul. 15, 2020    (KR) .......................... 10-2020-0087751

(51) Int. Cl.
*G01S 13/95*    (2006.01)
*G01S 7/288*    (2006.01)
(Continued)

(52) U.S. Cl.
CPC ............ *G01S 13/95* (2013.01); *G01S 7/2883* (2021.05); *G01S 7/2927* (2013.01); *G01S 7/414* (2013.01); *G01W 1/14* (2013.01)

(58) Field of Classification Search
CPC ...... G01S 13/951; G01S 17/95; G01S 15/885; G01S 7/418; G01S 13/956; G01S 13/958;
(Continued)

(56) References Cited

U.S. PATENT DOCUMENTS 5,724,125 A * 3/1998 Ames ...................... G01S 17/58
356/28.5
6,266,063 B1 * 7/2001 Baron ...................... G06T 17/05
345/419
(Continued)

FOREIGN PATENT DOCUMENTS

EP    3021136 A1 *  5/2016  ............. G01S 13/58
KR    10-1258668 B    5/2013
(Continued)

*Primary Examiner* — Olumide Ajibade Akonai
(74) *Attorney, Agent, or Firm* — Novick, Kim & Lee, PLLC; Sang Ho Lee; Hyun Woo Shin

(57) ABSTRACT

A method for retrieval of lost radial velocity in weather radar includes expanding a radial velocity area to non-meteorological echoes including sea clutter and chaff echo using raw radar data for use of a wind field calculation area, correcting radial velocity by replacing the radial velocity determined as noise using a median sign comparison method with a median calculated within a window to which the radial velocity belongs, distinguishing a lost radial velocity area by comparing the corrected radial velocity with radar reflectivity data, and retrieving lost radial velocity using a Velocity Azimuth Display (VAD) fit function representing radial velocity of particles observed along a radar radiation source at a certain elevation in the lost radial velocity area as a function of an azimuth angle. Accordingly, it is possible to improve the quality of calculated wind field using the improved radar radial velocity, and provide more accurate dynamic structure information of the precipitation system.

20 Claims, 13 Drawing Sheets

(51) Int. Cl.
*G01S 7/292* (2006.01)
*G01S 7/41* (2006.01)
*G01W 1/14* (2006.01)

(58) Field of Classification Search
CPC .......... G01S 13/95; G01S 7/411; G01S 13/58; G01S 7/295; G01S 7/414; G01S 7/412; G01S 13/953; G01S 7/41; G01S 7/292; G01S 7/354; G01S 13/582; G01S 13/955; G01W 1/10; G01W 1/00; G01W 1/06; G01W 1/02; G01W 2203/00; G01W 1/18; Y02A 90/10

See application file for complete search history.

(56) References Cited

U.S. PATENT DOCUMENTS

| | | | |
|---|---|---|---|
| 6,683,609 B1* | 1/2004 | Baron, Sr. | G01W 1/10 |
| | | | 345/419 |
| 7,558,674 B1* | 7/2009 | Neilley | G01W 1/02 |
| | | | 702/3 |
| 9,244,167 B1* | 1/2016 | Oransky | G01S 13/87 |
| 9,864,055 B1* | 1/2018 | Sishtla | B64D 15/20 |
| 10,809,375 B1* | 10/2020 | Dana | G01S 7/024 |
| 2003/0025627 A1* | 2/2003 | Wilson | G01S 13/951 |
| | | | 702/3 |
| 2008/0001808 A1* | 1/2008 | Passarelli, Jr. | G01S 13/5244 |
| | | | 342/26 R |
| 2015/0309208 A1* | 10/2015 | Sneed | G01C 21/3691 |
| | | | 702/3 |
| 2019/0162838 A1* | 5/2019 | Luu | G01S 7/414 |
| 2021/0311089 A1* | 10/2021 | Nabi | G01S 15/58 |
| 2021/0311196 A1* | 10/2021 | Nabi | G01P 5/26 |

FOREIGN PATENT DOCUMENTS

| | | |
|---|---|---|
| KR | 10-2014-0088444 A | 7/2014 |
| KR | 10-1528525 B | 6/2015 |
| KR | 10-1686151 B | 12/2016 |
| KR | 10-1871315 B | 6/2018 |
| KR | 10-2019-0068793 A | 6/2019 |
| KR | 10-2113673 B | 5/2020 |

* cited by examiner

FIG. 5

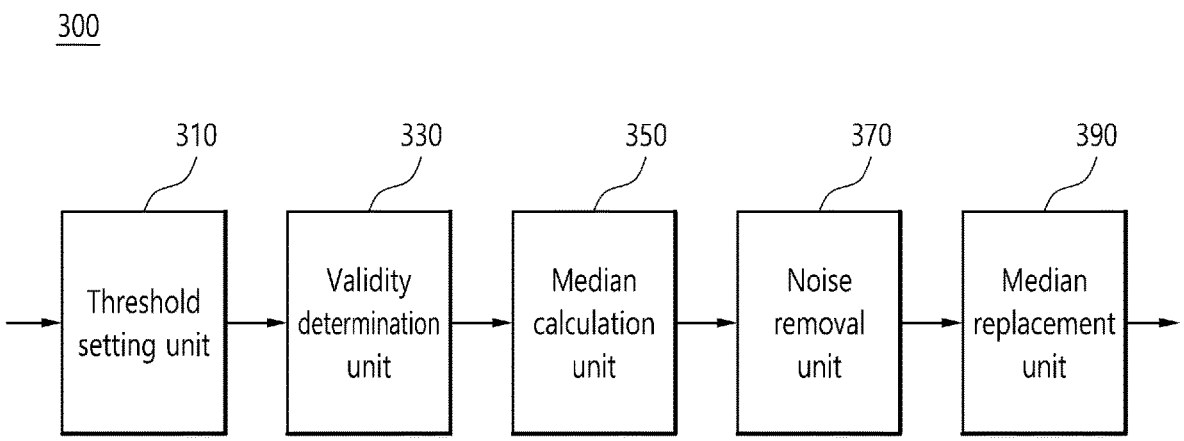

FIG. 6

| | 1) invalid radial velocity(Vr) at the center of domain | 2) Small number of valid Vr in the domain => (nan) | 3) Same sign of the center Vr with median value |
|---|---|---|---|
| Condition for No Noise Correction | +12 \| -17 \| -15<br>-14 \| nan \| -11<br>nan \| -9 \| nan<br><br>Center Vr = nan | +12 \| nan \| nan<br>nan \| -13 \| nan<br>nan \| -9 \| nan<br><br>Number of valid Vr = 2/8 (25%) | +12 \| -17 \| -15<br>-14 \| -13 \| -11<br>nan \| -9 \| nan<br><br>Median = -11.0 m/s<br>→ sign : negative<br>Center = -13.0 m/s<br>→ sign : negative |

METHOD FOR RETRIEVAL OF LOST RADIAL VELOCITY IN WEATHER RADAR, RECORDING MEDIUM AND DEVICE FOR PERFORMING THE METHOD

CROSS-REFERENCE TO RELATED APPLICATIONS

This application claims priority under 35 U.S.C. § 119 to Korean Patent Application No. 10-2020-0087751, filed on Jul. 15, 2020, in the Korean Intellectual Property Office, the disclosure of which is incorporated herein by reference in its entirety.

TECHNICAL FIELD

The present disclosure relates to a method for retrieval of lost radial velocity in weather radar, a recording medium and a device for performing the same, and more particularly, to technology for retrieval of lost radial velocity in weather radar using correction of abnormal noise in radial velocity and azimuthal direction fitting.

BACKGROUND

In the Republic of Korea, the weather radar center provides real-time nationwide 3-dimensional (3D) radar wind fields starting from February 2019 through development of 3D radar wind field calculation technology using the calculus of variations such as WInd Synthesis System using DOppler Measurements (WISSDOM).

The quality of the Doppler velocity fields observed with Doppler radars is a factor that greatly affects the accuracy of the wind calculation. The Dual Pulse Repetition Frequency (dual-PRF) technique is commonly used for dealiasing of the Doppler velocities in weather radars.

In meteorological administration Doppler radars, the Nyquist Velocity was extended up to 132 $ms^{-1}$ using 5:4 dual-PRF. However, a considerable amount of noise occurs in the radial velocities due to the limitation of the dual-PRF technique, and losses of radial velocity values occur at grid points with reflectivity.

SUMMARY

In view of this circumstance, the present disclosure is directed to providing a method for retrieval of lost radial velocity in weather radar to improve the quality of the radial velocity.

The present disclosure is further directed to providing a recording medium having recorded thereon a computer program for performing the method for retrieval of lost radial velocity in weather radar.

The present disclosure is further directed to providing a device for performing the method for retrieval of lost radial velocity in weather radar.

A method for retrieval of lost radial velocity in weather radar according to an embodiment for achieving the above-described object of the present disclosure includes expanding a radial velocity area to non-meteorological echoes including sea clutter and chaff echo using raw radar data for use of a wind field calculation area, correcting radial velocity by replacing the radial velocity determined as noise using a median sign comparison method with a median calculated within a window to which the radial velocity belongs, distinguishing a lost radial velocity area by comparing the corrected radial velocity with radar reflectivity data, and retrieving lost radial velocity using a Velocity Azimuth Display (VAD) fit function representing radial velocity of particles observed along a radar radiation source at a certain elevation in the lost radial velocity area as a function of an azimuth angle.

In an embodiment of the present disclosure, expanding the radial velocity area to the non-meteorological echoes including sea clutter and chaff echo may include generating a Sea Clutter Map (SCM) using Frequency Of Reflectivity (FOR) of the raw radar data, distinguishing the chaff echo based on a 2-dimensional object recognition scheme from the raw radar data, and recovering the sea clutter and the chaff echo to the non-meteorological echo removed radar data.

In an embodiment of the present disclosure, generating the sea clutter map may include setting a frequency of reflectivity threshold for sea clutter observation and a maximum elevation angle threshold, collecting frequency of reflectivity data which is an accumulation of reflectivity observed for a day or longer for each elevation angle, overlapping the frequency of reflectivity data with terrain data when the frequency of reflectivity is larger than the frequency of reflectivity threshold for each elevation angle, and determining as the sea clutter when the frequency of reflectivity data and the terrain data do not overlap.

In an embodiment of the present disclosure, generating the sea clutter map may further include completing the sea clutter map for each elevation angle by repeating until a maximum elevation angle set to the maximum elevation angle threshold.

In an embodiment of the present disclosure, distinguishing the chaff echo may include removing meteorological echoes and ground clutter from the raw radar data using an echo type classification (TID) result, identifying a 2-dimensional (2D) object based on a 2D cell clustering scheme in a polar coordinate system where the meteorological echoes and the ground clutter are removed, and determining as the chaff echo (chaff 2D) when preset variables of each identified 2D object are smaller than corresponding thresholds.

In an embodiment of the present disclosure, determining the chaff echo may further include completing a Chaff Echo Map (CEM) for each elevation angle by repeating all over the elevation angle.

In an embodiment of the present disclosure, distinguishing the chaff echo may further include regarding as noise and removing when an area of the identified 2D object is smaller than the threshold, and regarding as noise and removing when the preset variables of each identified object are equal to or larger than the corresponding thresholds.

In an embodiment of the present disclosure, identifying the 2D object may include distinguishing radar gates (grid points) based on preset thresholds in each elevation angle data of the polar coordinate system, and assigning an individual number to define elements, defining consecutive elements within a preset range in a radial direction as identical segments, and defining consecutive segments within a preset range in an azimuthal direction as components which are the 2D object.

In an embodiment of the present disclosure, correcting the radial velocity may include setting a window size and a threshold for a valid radial velocity ratio with respect to the expanded radial velocity area, determining if the radial velocity at a center of the window is valid, calculating a median from radial velocities except the window center radial velocity when the window center radial velocity is valid or when the ratio of valid radial velocity in the window is larger than the threshold, determining the window center radial velocity as noise and removing when a sign of the window center radial velocity is unequal to a sign of the median or when the sign of the window center radial velocity is equal to the sign of the median but its difference is larger than the threshold, and recovering the removed window center radial velocity by replacing with the median.

In an embodiment of the present disclosure, correcting the radial velocity may further include processing the window center radial velocity as an invalid value when the window center radial velocity is invalid or when the ratio of the number of valid radial velocities in the window is equal to or smaller than the threshold.

In an embodiment of the present disclosure, distinguishing the lost radial velocity area may include setting threshold number of valid radial velocities, threshold number of lost radial velocities relative to reflectivity and an error threshold, and identifying the lost radial velocity area (Velocity Loss Area (VLA)) relative to reflectivity when the number of valid radial velocities in in a preset range is larger than the threshold.

In an embodiment of the present disclosure, the error may be a difference between a VAD curve and a real radial velocity value.

In an embodiment of the present disclosure, retrieving the lost radial velocity may include performing VAD curve fitting based on a real radial velocity and a Fourier series for each azimuth angle when a size of the VLA is smaller than the threshold, and retrieving the lost radial velocity along the VAD curve when a difference between a value of the VAD curve and the real radial velocity value is smaller than the error threshold at each azimuth angle.

A computer-readable storage medium according to an embodiment for achieving another object of the present disclosure has recorded thereon a computer program for performing the method for retrieval of lost radial velocity in weather radar.

A device for retrieval of lost radial velocity in weather radar according to an embodiment for achieving still another object of the present disclosure includes an area expansion unit to expand a radial velocity area to non-meteorological echoes including sea clutter and chaff echo using raw radar data for use of a wind field calculation area, a radial velocity correction unit to correct radial velocity by replacing the radial velocity determined as noise using a median sign comparison method with a median calculated within a window to which the radial velocity belongs, an area distinguishing unit to distinguish a lost radial velocity area by comparing the corrected radial velocity with radar reflectivity data, and a radial velocity replacement unit to retrieve lost radial velocity using a VAD fit function representing radial velocity of particles observed along a radar radiation source at a certain elevation in the lost radial velocity area as a function of an azimuth angle.

In an embodiment of the present disclosure, the area expansion unit may include a sea clutter unit to generate a Sea Clutter Map (SCM) using Frequency Of Reflectivity (FOR) of the raw radar data, a chaff echo unit to determine the chaff echo based on a 2D object recognition scheme from the raw radar data, and an area recovery unit to recover the sea clutter and the chaff echo to the non-meteorological echo removed radar data.

In an embodiment of the present disclosure, the chaff echo unit may include an element unit to distinguish radar gates (grid points) based on preset thresholds in each elevation angle data of a polar coordinate system and assign an individual number to define elements, a segment unit to define consecutive elements within a preset range in a radial direction as identical segments, a component unit to define consecutive segments within a preset range in an azimuthal direction as components which are the 2D object, and a noise cancelation unit to regard as noise and remove when preset variables of each identified object are equal to or larger than the corresponding thresholds.

In an embodiment of the present disclosure, the radial velocity correction unit may include a threshold setting unit to set a window size and a threshold for a valid radial velocity ratio with respect to the expanded radial velocity area, a validity determination unit to determine if the radial velocity at a center of the window is valid, and process the window center radial velocity as an invalid value when the window center radial velocity is invalid, a median calculation unit to calculate a median in remaining radial velocities except the window center radial velocity when the window center radial velocity is valid or when the ratio of valid radial velocity in the window is larger than the threshold, a noise removal unit to determine the window center radial velocity as noise and remove when a sign of the window center radial velocity is unequal to a sign of the median or when the sign of the window center radial velocity is equal to the sign of the median but its difference is larger than the threshold, and process the window center radial velocity as an invalid value when the ratio of the number of valid radial velocities in the window is equal to or smaller than the threshold, and a median replacement unit to recover the removed window center radial velocity by replacing with the median.

In an embodiment of the present disclosure, the area distinguishing unit may include a characteristics configuration unit to set threshold number of valid radial velocities, threshold number of lost radial velocities relative to reflectivity and an error threshold which is a difference between a VAD curve and a real radial velocity value, and a VLA identification unit to identify the lost radial velocity area (VLA) relative to reflectivity when the number of valid radial velocities in a preset range is larger than the threshold.

In an embodiment of the present disclosure, the radial velocity replacement unit may include a VAD curve fitting unit to perform VAD curve fitting based on a real radial velocity and a Fourier series for each azimuth angle when a size of the VLA is smaller than the threshold, and a radial velocity replacement unit to retrieve the lost radial velocity along the VAD curve when a difference between a value of the VAD curve and the real radial velocity value is smaller than the error threshold at each azimuth angle.

According to the method for retrieval of lost radial velocity in weather radar, it is possible to improve the accuracy of 3D wind fields using radar radial velocities by removing radial velocity noise.

Additionally, it is possible to expand the wind field calculation area using radial velocities of echoes (sea clutter, chaff echo) that have not been used before, and calculate radar wind fields more similar to real winds such as strong winds in typhoons.

Through this, it is possible to calculate more accurate wind fields through radial velocity quality control, and can be used to prevent meteorological disasters through early detection of hazardous weather and rapid response.

BRIEF DESCRIPTION OF THE DRAWINGS

FIG. 5 is a block diagram of a radial velocity correction unit of FIG. 1.

FIG. 6 is a conceptual diagram for describing that window center radial velocity is not determined as noise by the radial velocity correction unit of FIG. 5.

DETAILED DESCRIPTION OF EMBODIMENTS

Figure 1:
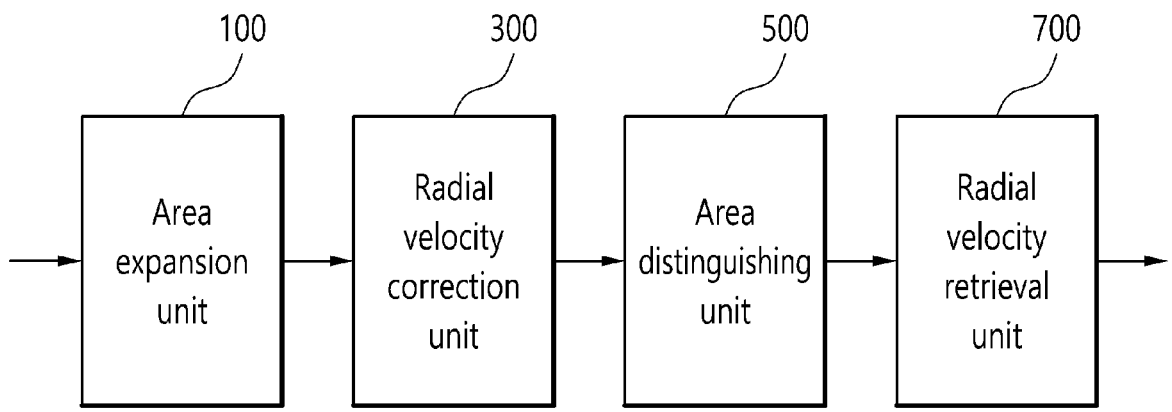
FIG. 1 is a block diagram of a device for retrieval of lost radial velocity in weather radar according to an embodiment of the present disclosure.

The following detailed description of the present disclosure is made with reference to the accompanying drawings, in which particular embodiments for practicing the present disclosure are shown for illustration purposes. These embodiments are described in sufficiently detail for those skilled in the art to practice the present disclosure. It should be understood that various embodiments of the present disclosure are different but do not need to be mutually exclusive. For example, particular shapes, structures and features described herein in connection with one embodiment may be implemented in other embodiment without departing from the spirit and scope of the present disclosure. It should be further understood that changes may be made to the positions or placement of individual elements in each disclosed embodiment without departing from the spirit and scope of the present disclosure. Accordingly, the following detailed description is not intended to be taken in limiting senses, and the scope of the present disclosure, if appropriately described, is only defined by the appended claims along with the full scope of equivalents to which such claims are entitled. In the drawings, similar reference signs denote same or similar functions in many aspects.

The term "unit" is defined herein as having its broadest definition to an ordinary skill in the art to refer to a software including instructions executable in a non-transitory computer readable medium that would perform the associated function when executed, a circuit and/or a processor designed to perform the associated function, a hardware designed to perform the associated function, or a combination of a software, a circuit, or a hardware designed to perform the associated function.

Further, it is to be understood that all detailed descriptions mentioning specific embodiments of the present disclosure as well as principles, aspects, and embodiments of the present disclosure are intended to include structural and functional equivalences thereof. Further, it is to be understood that these equivalences include an equivalence that will be developed in the future as well as an equivalence that is currently well-known, that is, all elements invented so as to perform the same function regardless of a structure.

Therefore, it is to be understood that, for example, block diagrams of the present specification illustrate a conceptual aspect of an illustrative circuit for embodying a principle of the present disclosure. Therefore, it is to be understood that all flow charts, state transition diagrams, pseudo-codes, and the like, illustrate various processes that may be tangibly embodied in a computer-readable medium and that are executed by computers or processors regardless of whether or not the computers or the processors are clearly illustrated.

Functions of various elements including processors or functional blocks represented as concepts similar to the processors and illustrated in the accompanying drawings may be provided using hardware having capability to execute software in connection with appropriate software as well as dedicated hardware. When the functions are provided by the processors, they may be provided by a single dedicated processor, a single shared processor, or a plurality of individual processors, and some of them may be shared with each other.

In addition, the explicit use of terms presented as the processor, control, or similar concepts should not be interpreted exclusively by quoting hardware capable of executing software, but should be understood to implicitly include, without limitation, digital signal processor (DSP) hardware, a ROM for storing software, a RAM, and a non-volatile memory. The above-mentioned terms may also include well-known other hardware.

In the claims of the present specification, components represented as means for performing functions mentioned in a detailed description are intended to include all methods for performing functions including all types of software including, for example, a combination of circuit devices performing these functions, firmware/micro codes, or the like, and are coupled to appropriate circuits for executing the software so as to execute these functions. It is to be understood that since functions provided by variously mentioned means are combined with each other and are combined with a method demanded by the claims in the present disclosure defined by the claims, any means capable of providing these functions are equivalent to means recognized from the present specification.

Hereinafter, the preferred embodiments of the present disclosure will be described in more detail with reference to the accompanying drawings.

FIG. 1 is a block diagram of a device for retrieval of lost radial velocity in weather radar according to an embodiment of the present disclosure.

The present disclosure is designed to improve the quality of WInd Synthesis System using DOppler Measurements (WISSDOM) wind fields using quality controlled radar radial velocity fields through technology development of correction of abnormal noise and retrieval of lost radial velocity in weather radar radial velocity observation data.

The device 10 for retrieval of lost radial velocity in weather radar (hereinafter, the device) according to the present disclosure may improve the quality of calculated wind fields using radar radial velocity with improved quality, and provide more accurate dynamic structure information of the precipitation system.

The present disclosure is largely subjected to the following three algorithms for quality control of radar radial velocity: 1) radial velocity area expansion using non-meteorological echoes (sea clutter, chaff echo), 2) radial velocity noise removal and recovery, 3) lost radial velocity retrieval using Velocity Azimuth Display (VAD) fitting.

In other words, first, a radial velocity area is expanded by recovering a non-meteorological echo area that may be used for wind field calculation. Additionally, noise is distinguished through comparison with neighbor values within a window and corrected using the median. Finally, a lost radial velocity area is detected by comparison with reflectivity, and lost radial velocity is retrieved across wide areas using a VAD fit function.

Referring to FIG. 1, the device 10 according to the present disclosure includes an area expansion unit 100, a radial velocity correction unit 300, an area distinguishing unit 500 and a radial velocity retrieval unit 700.

The area expansion unit 100 performs 1) radial velocity area expansion using non-meteorological echoes (sea clutter, chaff echo), and the radial velocity correction unit 300 performs 2) radial velocity noise removal and recovery. Additionally, the area distinguishing unit 500 and the radial velocity retrieval unit 700 perform 3) lost radial velocity retrieval using VAD fitting.

The device 10 of the present disclosure may run software (application) for retrieval of lost radial velocity in weather radar installed thereon, and the area expansion unit 100, the radial velocity correction unit 300, the area distinguishing unit 500 and the radial velocity retrieval unit 700 may be controlled by the software for retrieval of lost radial velocity in weather radar, run on the device 10.

The device 10 may be a separate terminal from weather radar or modules of the terminal. Additionally, the area expansion unit 100, the radial velocity correction unit 300, the area distinguishing unit 500 and the radial velocity retrieval unit 700 may be formed as an integrated module or at least one module. However, to the contrary, each element may be formed as a separate module.

The device 10 may be in the form of a server or an engine, and may be mobile or fixed. The device 10 may be interchangeably used with a device, an apparatus, a terminal, user equipment (UE), a mobile station (MS), a wireless device and a handheld device.

The device 10 may execute or create a variety of software based on an Operation System (OS), namely, a system. The OS is a system program for enabling software to use the hardware of the device, and may include mobile computer OS including Android OS, iOS, Windows Mobile OS, Bada OS, Symbian OS and Blackberry OS and computer OS including Windows family, Linux family, Unix family, MAC, AIX and HP-UX.

The area expansion unit 100 expands the radial velocity area to non-meteorological echoes such as sea clutter and chaff echo using raw radar data for use of a wind field calculation area.

To this end, the area expansion unit 100 generates a sea clutter map using frequency of reflectivity (FOR), distinguishes chaff echo based on a 2-dimensional (2D) object recognition scheme, and recovers the distinguished non-meteorological echoes (sea clutter, chaff echo) to the radial velocity field.

The typical non-meteorological echoes that may be used for the wind field calculation area using radar radial velocity are sea clutter and chaff echo. The sea clutter is echo occurring by contact of radar with the sea surface and includes information of wind due to the characteristics of sea waves that change with the wind. The chaff echo is echo occurring due to chaff dispensed from aircraft and moves with the wind, and thus may use radial velocity.

The quality controlled radar data is reflectivity and radial velocity images from which non-meteorological echoes such as sea clutter are removed in the quality control procedure. To make use of radial velocities of non-meteorological echoes, it is necessary to recover sea clutter and chaff echo. Accordingly, the present disclosure recovers sea clutter and chaff echo and uses for radial velocity retrieval.

The area expansion unit 100 generates a Sea Clutter Map (SCM) and a Chaff Echo Map (CEM) using raw radar data before quality control. Additionally, SCM and CEM radial velocities are recovered to the non-meteorological echo removed radar data.

Figure 2:
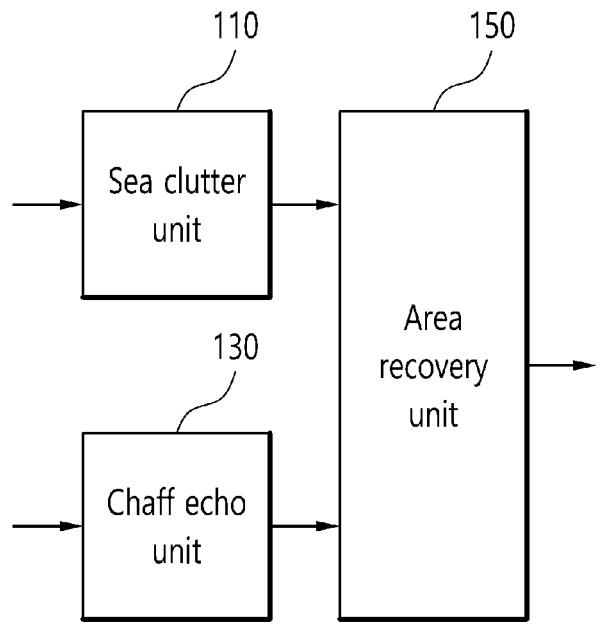
FIG. 2 is a block diagram of an area expansion unit of FIG. 1.

Referring to FIG. 2, the area expansion unit 100 includes a sea clutter unit 110 to generate a sea clutter map using frequency of reflectivity of raw radar data, a chaff echo unit 130 to distinguish chaff echo based on the 2D object recognition scheme from the raw radar data, and an area recovery unit 150 to recover sea clutter and chaff echo to non-meteorological echo removed radar data.

The sea clutter unit 110 uses frequency of reflectivity which is an accumulation of raw radar data reflectivity to distinguish sea clutter. In this instance, frequency of reflectivity data which is an accumulation of reflectivity observed for one day or longer may be used.

The reflectivity accumulation process is performed for each elevation angle, and when the elevation angle is high, it is difficult to observe sea clutter, so the threshold of the maximum elevation angle may be set. Additionally, when the frequency of reflectivity is larger than the threshold (for example, 40%), terrain data is used to overlap the frequency of reflectivity data with the terrain data.

In this instance, when the frequency of reflectivity data and the terrain data do not overlap, it is determined as sea clutter, and a sea clutter map is completed for each elevation angle by repeating until the maximum elevation angle set to the threshold. In the embodiments of the present disclosure, the conditions such as variables and thresholds used in the process of generating the sea clutter map and identifying the sea clutter may be changed as necessary.

The chaff echo unit 130 works after removing meteorological echoes and ground clutter from data before non-meteorological echo quality control using the 2D object recognition (clustering) scheme and the echo type classification (TID) result to distinguish chaff echo.

Figure 3:
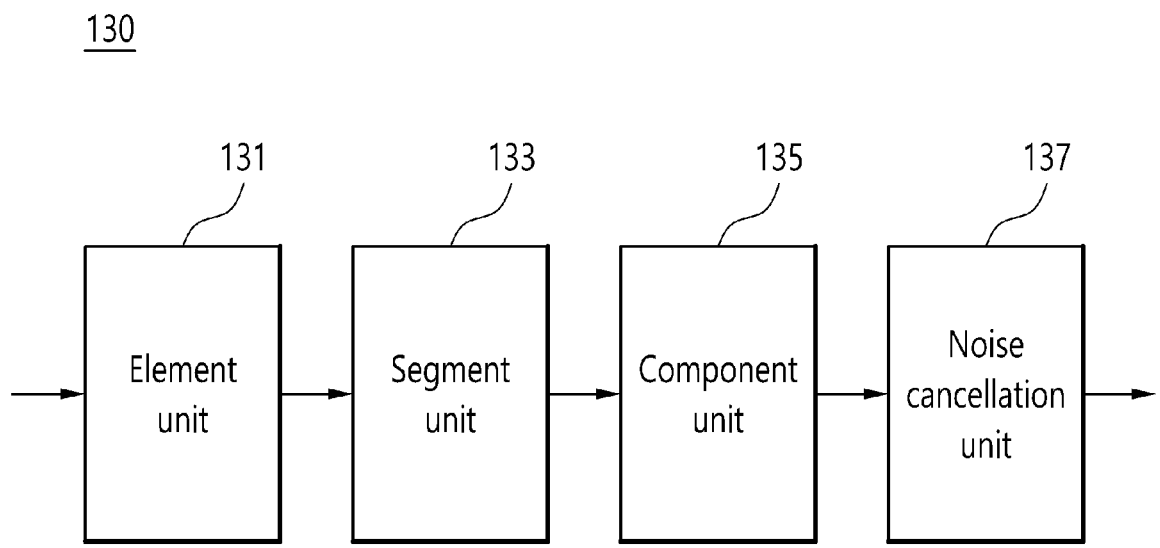
FIG. 3 is a block diagram of a chaff echo unit of FIG. 2.
Figure 4:
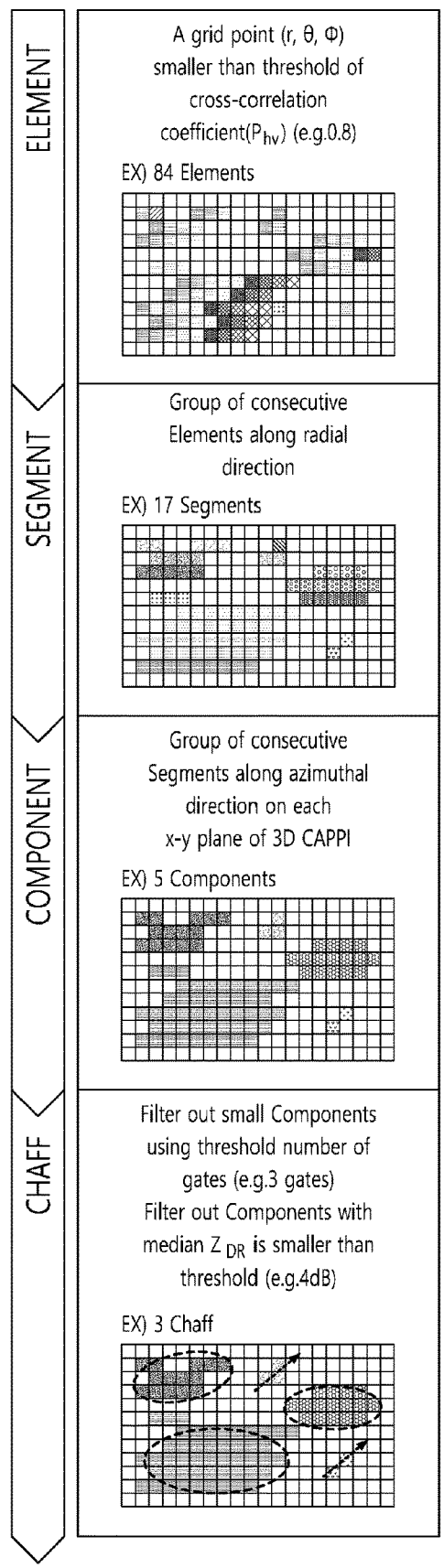
FIG. 4 is a conceptual diagram for describing a 2-dimensional object recognition scheme used by the chaff echo unit of FIG. 3.

Referring to FIG. 3, the chaff echo unit 130 includes an element unit 131, a segment unit 133, a component unit 135 and a noise cancelation unit 137. FIG. 4 is a conceptual diagram for describing the 2D object recognition scheme used by the chaff echo unit of FIG. 3.

Referring to FIGS. 3 and 4, the object recognition scheme is performed for each elevation angle, and first, the element unit 131 distinguishes radar gates (grid points) based on the thresholds (for example, $\rho_{hv}$(RhoHV) of 0.8 or less, SNR of 40 dB or less, and CCOR of 10 dB or less) in each elevation angle data of the polar coordinate system and assigns an individual number, and it is referred to as an element. In identifying the element, other variables such as ZDR and average rhohv may be used.

The segment unit 133 distinguishes continuous elements in the radial direction as identical segments for each of the distinguished elements. The component unit 135 distinguishes continuous segments in the azimuthal direction as a component for each segment.

When the area of the distinguished component is smaller than the threshold (for example, 3 radar gates), the noise cancelation unit 137 regards the corresponding component as noise and removes it, and when the thresholds for the variables of each identified component such as $\rho_{hv}$, SNR, CORR are not satisfied, removes and finally, distinguishes as chaff echo (chaff 2D).

In FIG. 4, 84 elements, 17 segments and 5 components are identified, and finally, among the 5 components, three 2D objects satisfying the conditions are distinguished as chaff echo.

The chaff echo unit 130 distinguishes chaff echo (chaff 2D) for each elevation angle and completes a Chaff Echo Map (CEM) for each elevation angle by repeating all over the elevation angle.

The radial velocity correction unit 300 corrects the radial velocity by replacing the radial velocity determined as noise using a median sign comparison method with the median calculated within a window to which the radial velocity belongs. The present disclosure uses the median sign comparison method to detect and recover radial velocity noise.

Referring to FIG. 5, the radial velocity correction unit 300 includes a threshold setting unit 310, a validity determination unit 330, a median calculation unit 350, a noise removal unit 370 and a median replacement unit 390.

The threshold setting unit 310 sets an optimal window size and a threshold ratio of valid radial velocity in the window. The validity determination unit 330 determines if radial velocity at the center of the window is valid, and if valid, processes to an invalid value when the ratio of valid radial velocity in the window is lower than the threshold.

The median calculation unit 350 calculates the median in the remaining radial velocities except the window center radial velocity when the ratio of valid radial velocity in the window is higher than the threshold.

The noise removal unit 370 determines as noise, removes and replaces with the median when the sign of the window center radial velocity is unequal to the sign of the median. Additionally, when the sign of the window center radial velocity is equal to the sign of the median, and its difference is larger than the threshold, the noise removal unit 370 determines as noise, removes and replaces with the median. The median replacement unit 390 replaces the removed window center radial velocity with the median to recover it.

Figure 7:
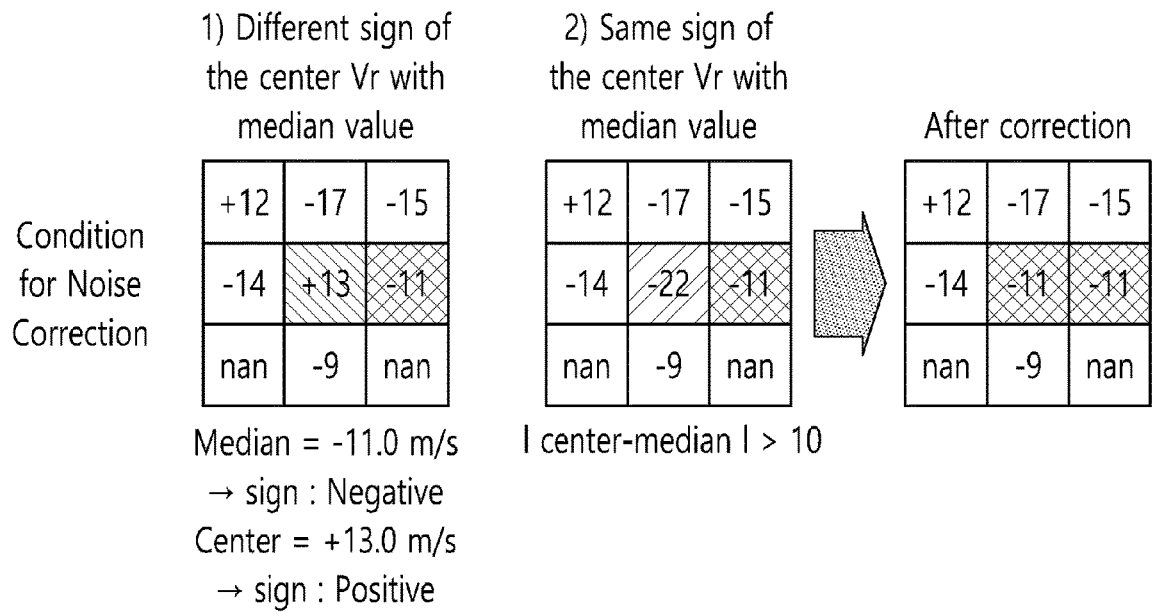
FIG. 7 is a conceptual diagram for describing that window center radial velocity is determined as noise by the radial velocity correction unit of FIG. 5.

FIG. 6 is a conceptual diagram for describing that the window center radial velocity is not determined as noise by the radial velocity correction unit of FIG. 5. FIG. 7 is a conceptual diagram for describing that the window center radial velocity is determined as noise by the radial velocity correction unit of FIG. 5.

Referring to FIGS. 6 and 7, an example of a radial velocity noise detection and recovery algorithm is shown, and the window size is set to 3 gates×3 rays and the window center radial velocity is determined by comparison with neighbor values in the set window.

In FIG. 6, when the window center radial velocity is invalid (Nan), when the ratio of invalid radial velocity in the window is equal to or less than 25% (in this case, the window center radial velocity is changed to an invalid value), and when the sign of domain median and the sign of observation value at the center of the domain are equal, it is determined not to be noise respectively.

In FIG. 7, when it is determined as noise, it is recovered by replacing with the median in the domain. That is, when the sign of the window center radial velocity is unequal to the sign of the median, or when the sign of the window center radial velocity is equal to the sign of the median but its difference is larger than the threshold, it is determined as noise, removed and replaced with the median.

The area distinguishing unit 500 distinguishes a lost radial velocity area by comparing the corrected radial velocity with radar reflectivity data. The present disclosure uses a fitting method using a VAD curve depicting the radial velocity of particles observed along a radiation source at a certain elevation in a single Doppler radar as a function of an azimuth angle to retrieve lost radial velocity.

Figure 8:
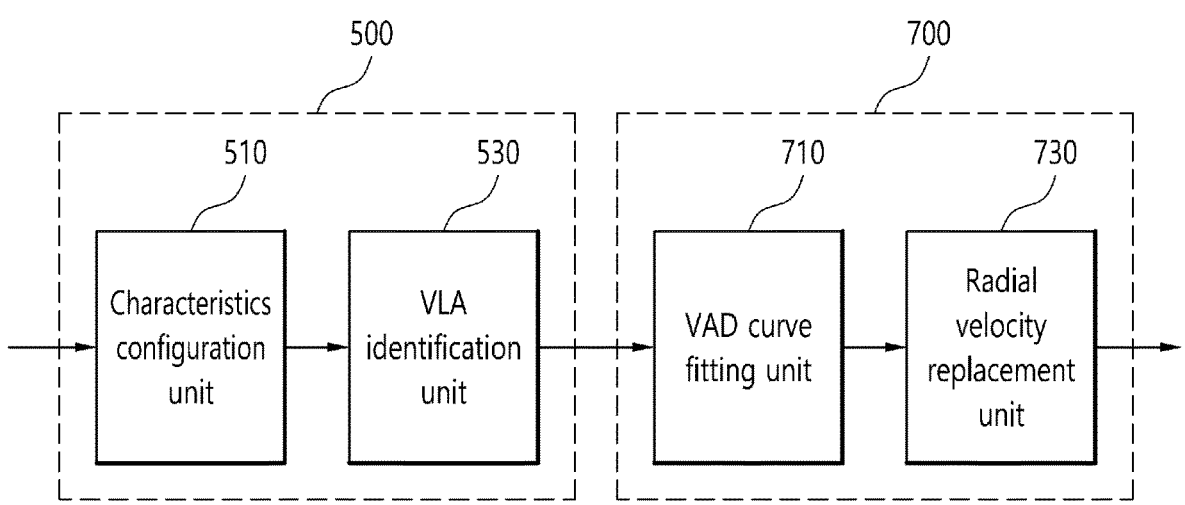
FIG. 8 is a block diagram of an area distinguishing unit and a radial velocity retrieval unit of FIG. 1.

Referring to FIG. 8, the area distinguishing unit 500 includes a characteristics configuration unit 510 and a VLA identification unit 530.

The characteristics configuration unit 510 sets threshold number of valid radial velocities, threshold number of lost radial velocities (Velocity Loss Area (VLA)) relative to reflectivity and an error threshold since fitting is possible when there is a large number of valid radial velocities in a given range. Here, the error refers to a difference between the VAD curve and the real radial velocity value.

The VLA identification unit 530 identifies the velocity loss area (VLA) relative to reflectivity when the number of valid radial velocities in the given range is larger than the threshold.

The radial velocity retrieval unit 700 retrieves lost radial velocity using a VAD fit function representing the radial velocity of particles observed along a radar radiation source at a certain elevation in the velocity loss area as a function of an azimuth angle.

The radial velocity retrieval unit 700 includes a VAD curve fitting unit 710 and a radial velocity replacement unit 730.

The VAD curve fitting unit 710 performs VAD curve fitting based on a Fourier series when the size of the VLA is smaller than the given threshold. When a difference between a value of the VAD curve and the real radial velocity value is smaller than the set error value, the radial velocity replacement unit 730 retrieves the lost radial velocity to be fitted to the VAD curve.

To represent the radial velocity as a Fourier series, the radial velocity Vr in the form of a spherical coordinate system is represented as the following Equation 1.

$$V_r = u \sin\theta \cos\phi + v \cos\theta \sin\phi + w \sin\phi \qquad \text{[Equation 1]}$$

Here, $\theta$ denotes the azimuth angle, $\pi$ denotes the elevation angle, and u, v, w denote an east-west component, a south-north component and a vertical component of the particle. Additionally, the radial velocity at the center of radar at a given elevation is represented as a component of linear wind field as shown in the following Equation 2.

$$V_r = \frac{1}{2} r \cos^2\phi \left(\frac{\partial u}{\partial x} + \frac{\partial v}{\partial y}\right) + w \sin\phi + u_0 \cos\theta \cos\phi + v_0 \sin\theta \cos\phi + \frac{1}{2} r \cos^2\phi \left(\frac{\partial u}{\partial x} - \frac{\partial v}{\partial y}\right) \cos 2\theta + \frac{1}{2} r \cos^2\phi \left(\frac{\partial u}{\partial y} + \frac{\partial v}{\partial x}\right) \sin 2\theta \qquad \text{[Equation 2]}$$

Here, r is the distance away from the center, and $u_0$, $v_0$ are speed components in the east-west direction and south-north direction from the center respectively.

The radial velocity represented as the linear wind field component may be represented as a second-order Fourier series as shown in the following Equation 3.

$$V_r = \sum_{n=0}^{2} (a_n \cos n\theta + b_n \sin n\theta) \qquad \text{[Equation 3]}$$

When comparing the right side of Equation 2 with the right side of Equation 3, each Fourier coefficient is given in the following Equations 4 to 8.

$$a_0 = \frac{1}{2}r\cos^2\phi\left(\frac{\partial u}{\partial x} + \frac{\partial v}{\partial y}\right) + w\sin\phi \quad \text{[Equation 4]}$$

$$a_1 = u_0\cos\phi \quad \text{[Equation 5]}$$

$$b_1 = v_0\cos\phi \quad \text{[Equation 6]}$$

$$a_2 = \frac{1}{2}r\cos^2\phi\left(\frac{\partial u}{\partial x} - \frac{\partial v}{\partial y}\right) \quad \text{[Equation 7]}$$

$$b_2 = \frac{1}{2}r\cos^2\phi\left(\frac{\partial u}{\partial y} + \frac{\partial v}{\partial x}\right) \quad \text{[Equation 8]}$$

Equation 2 may be re-written as the following Equation 9 based on the coefficients.

$$V_r = a_0 + a_1\cos\theta + b_1\sin\theta + a_2\cos 2\theta + b_2\sin 2\theta \quad \text{[Equation 9]}$$

When the coefficients $a_0$ to $b_2$ are calculated by solving the Fourier series by a numerical interpretation method (Singular Value Decomposition, LU decomposition, etc.), the VAD fit velocity for each azimuth angle is calculated according to Equation 9. Here, when the difference is larger than the threshold through comparison with the observation value as shown in the following Equation 10, the error is large, and it is excluded from radial velocity retrieval.

$$\sum_{\theta=0}^{350} |V_r(\theta)^{fitting} - V_r(\theta)^{measurement}| < V_r^{threshold} \quad \text{[Equation 10]}$$

Figure 9:
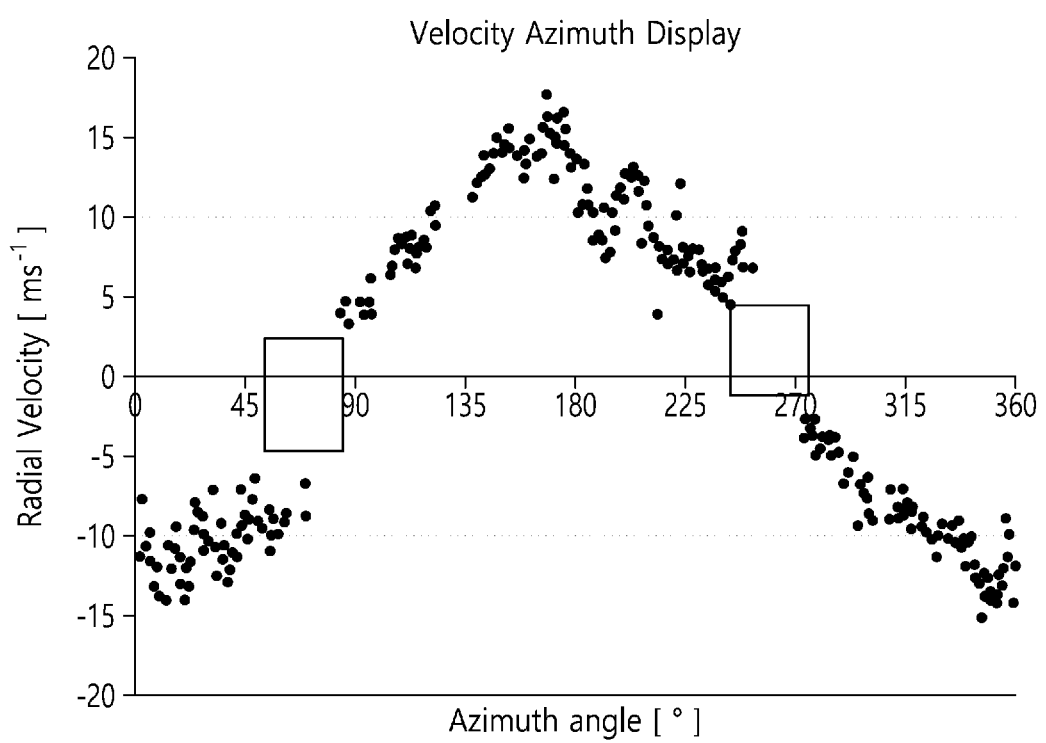
FIG. 9 is a graph showing radial velocity and a Velocity Azimuth Display (VAD) curve before radial velocity retrieval from radar data.
Figure 10:
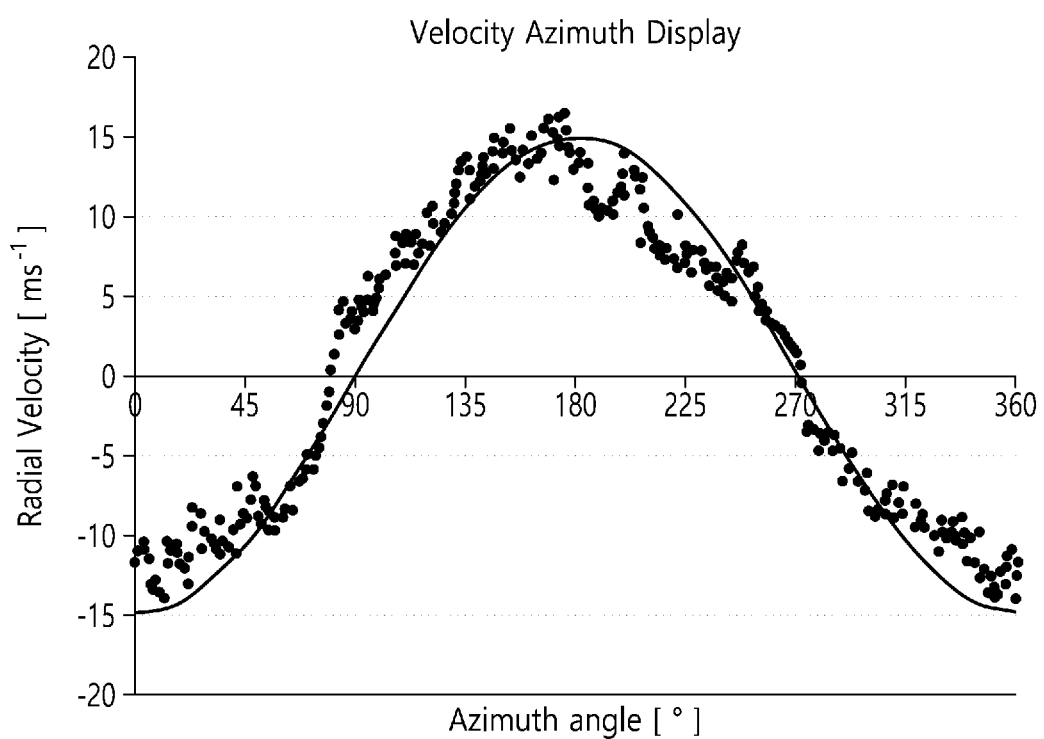
FIG. 10 is a graph showing radial velocity and a VAD curve after radial velocity retrieval according to the present disclosure in the same condition as FIG. 9.

FIG. 9 is a graph showing the radial velocity and the VAD curve before radial velocity retrieval from radar data. FIG. 10 is a graph showing the radial velocity and the VAD curve after radial velocity retrieval according to the present disclosure in the same condition as FIG. 9.

FIG. 9 shows an example before radial velocity retrieval for each of Mt. Gwanak (KWK) radar radial velocity (elev=)-0.2° at 1200 KST on Feb. 28, 2020 and a given radial velocity (about 175 km), and the lost radial velocity area is found at the areas of the azimuth angles of about 70° and about 260° (indicated by the boxes).

FIG. 10 shows an example of retrieval of lost radial velocity using VAD curve (a solid line) fitting according to the present disclosure.

The present disclosure proposes filtering using the median of the radial velocity sign to accurately remove only noise while maintaining meteorological echoes. Additionally, the present disclosure recovers a wind field close to an average flow of real wind through the fitting scheme assuming the linear wind field, and expands the wind field calculation area through radial velocity retrieval of non-meteorological echoes that have not been used before.

Figure 11:
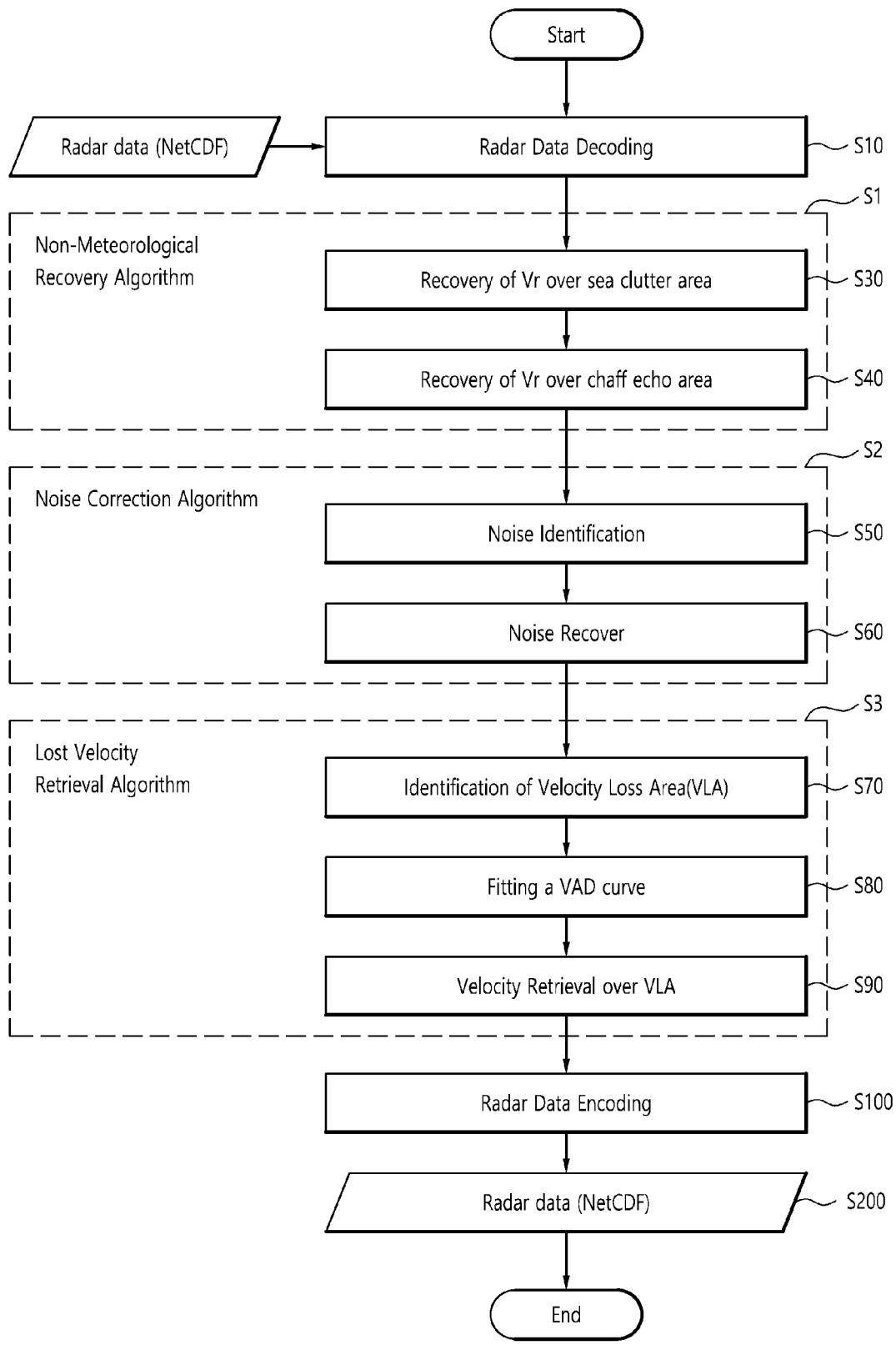
FIG. 11 is a flowchart of a method for retrieval of lost radial velocity in weather radar according to an embodiment of the present disclosure.

FIG. 11 is a flowchart of a method for retrieval of lost radial velocity in weather radar according to an embodiment of the present disclosure.

The method for retrieval of lost radial velocity in weather radar according to this embodiment may be performed in substantially the same configuration as the device 10 of FIG. 1. Accordingly, the same element as the device 10 of FIG. 1 is given the same reference sign, and a repetitive description is omitted herein.

Additionally, the method for retrieval of lost radial velocity in weather radar according to this embodiment may be performed by software (application) for retrieval of lost radial velocity in weather radar.

The present disclosure is designed to improve the quality of WISSDOM wind fields using quality controlled radar radial velocity fields through technology development of correction of abnormal noise and retrieval of lost radial velocity in weather radar radial velocity observation data.

Referring to FIG. 11, the method for retrieval of lost radial velocity in weather radar according to this embodiment is largely subjected to the following three algorithms for quality control of radar radial velocity: (S1) radial velocity area expansion using non-meteorological echoes (sea clutter, chaff echo), (S2) radial velocity noise removal and recovery, and (S3) lost radial velocity retrieval using VAD fitting.

First, in S1, a radial velocity area is expanded to non-meteorological echoes such as sea clutter (S30) and chaff echo (S40) using decoded raw radar data (S10) for use of a wind field calculation area.

Subsequently, in S2, radial velocity is corrected by replacing radial velocity determined as noise using a median sign comparison method (S50) with the median calculated within a window to which the radial velocity belongs (S60).

Finally, in S3, a lost radial velocity area is distinguished by comparing the corrected radial velocity with radar reflectivity data (S70), and lost radial velocity is retrieved (S90) using a VAD fit function representing the radial velocity of particles observed along a radar radiation source at a certain elevation in the lost radial velocity area as a function of an azimuth angle (S80).

Subsequently, through a radar data encoding process (S100), radar data may be finally outputted (S200).

Hereinafter, each step of the method for retrieval of lost radial velocity in weather radar according to this embodiment will be described in detail with reference to FIGS. 12 to 16.

Figure 12:
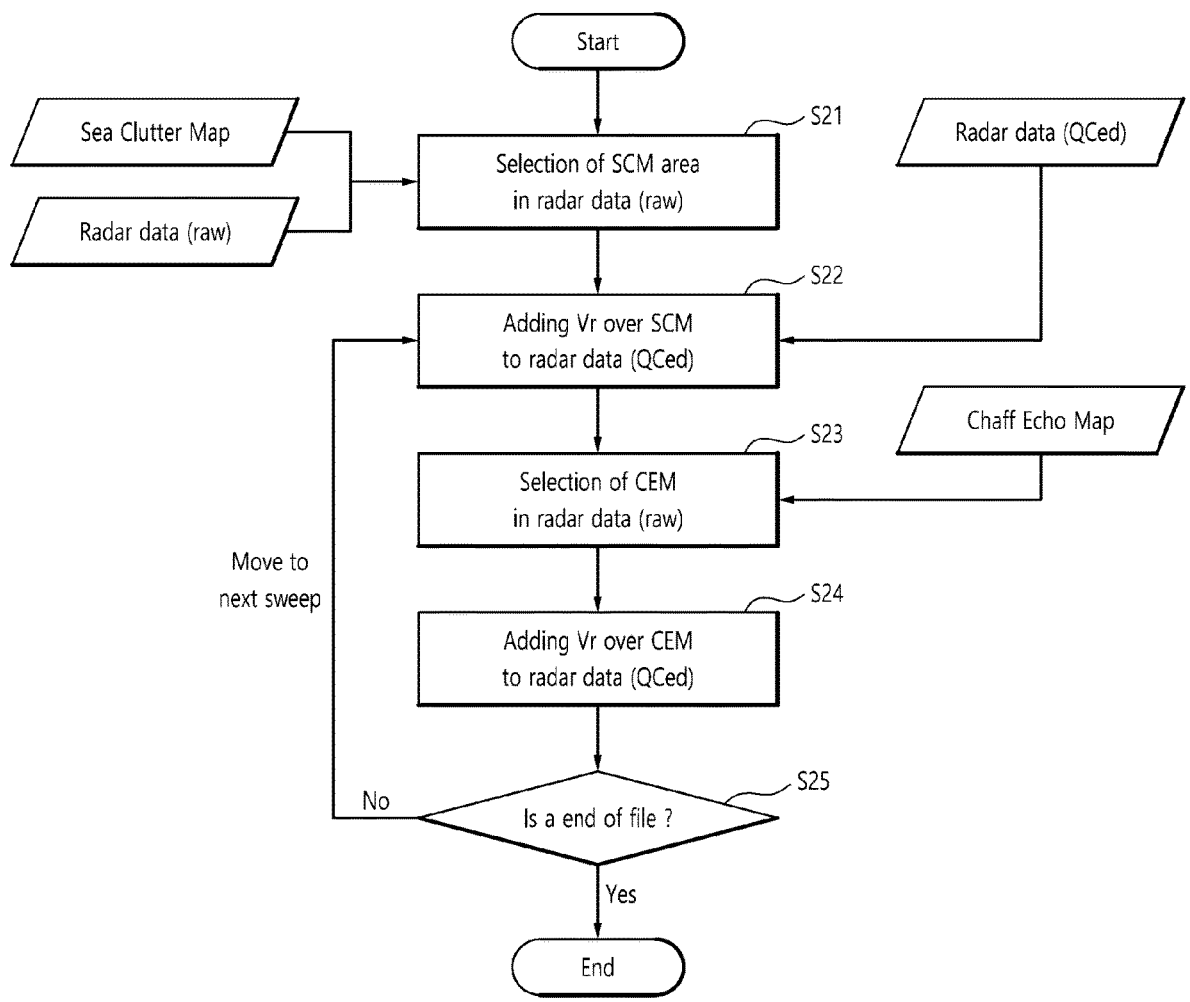
FIG. 12 is a whole flowchart of S1 in FIG. 11.

FIG. 12 is a whole flowchart of the step S1 in FIG. 11.

Referring to FIG. 12, in the step (S1) of expanding the radial velocity area to non-meteorological echoes such as sea clutter and chaff echo, a Sea Clutter Map (SCM) is generated (S22) using frequency of reflectivity (FOR) of raw radar data (S21).

Additionally, chaff echo is distinguished (S23) based on the 2D object recognition scheme from the raw radar data (S23), and sea clutter and chaff echo are recovered to the non-meteorological echo removed radar data (S23). This process is performed until the end of all files (S25).

Figure 13:
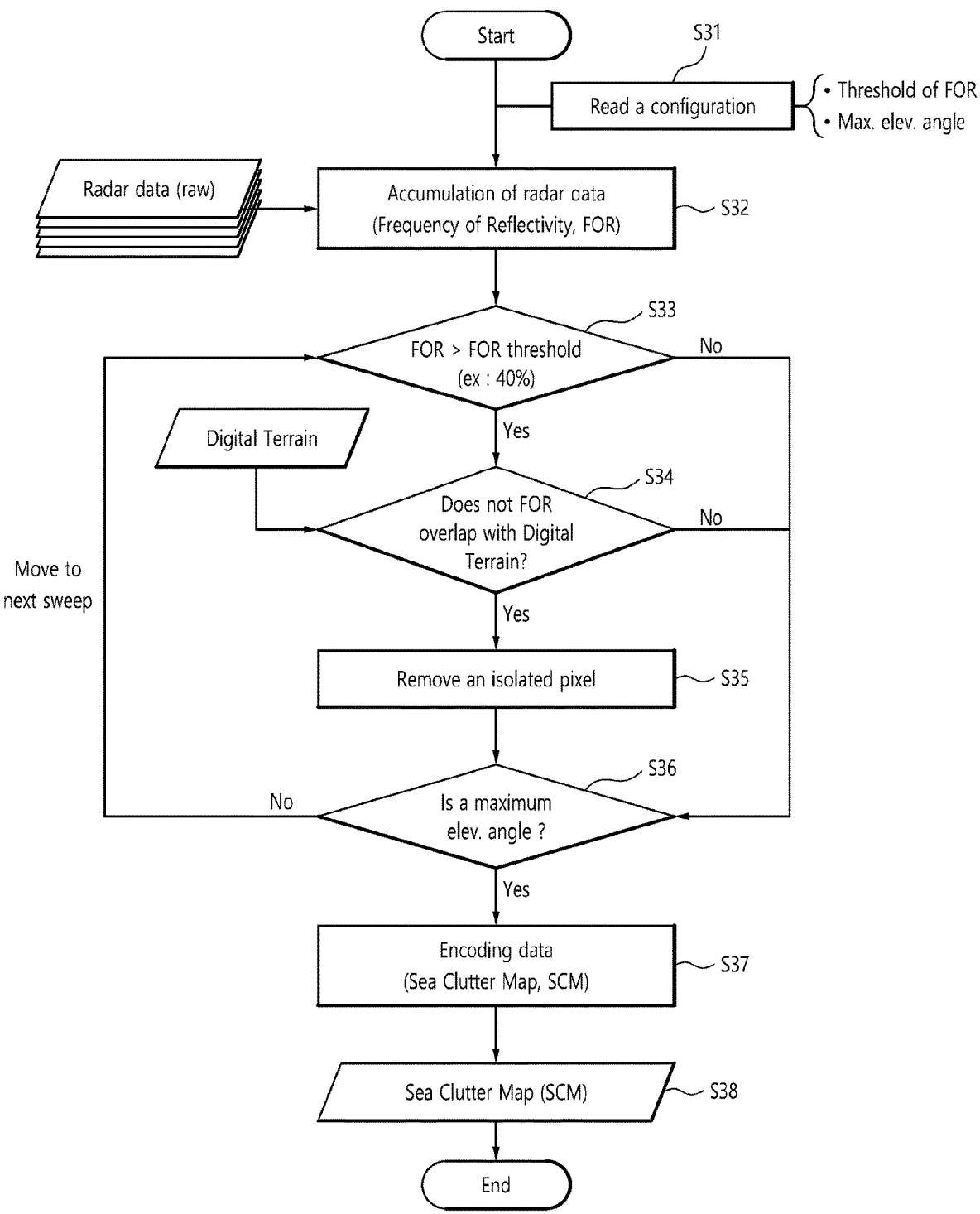
FIG. 13 is a detailed flowchart of S30 in FIG. 11.

FIG. 13 is a detailed flowchart of the step S30 in FIG. 11.

Referring to FIG. 13, in the step of generating the sea clutter map, first, a frequency of reflectivity threshold for sea clutter observation and a maximum elevation angle threshold are set (S31).

In this process, frequency of reflectivity data which is an accumulation of reflectivity observed for one day or longer is collected for each elevation angle (S32), and when the frequency of reflectivity is larger than the frequency of reflectivity threshold (for example, 40%) for each elevation angle (S33), terrain data is used to overlap the frequency of reflectivity data with the terrain data.

When the frequency of reflectivity data and the terrain data do not overlap (S34), it is determined as sea clutter (S38) by data encoding (S37). In this instance, an isolated pixel may be removed (S35).

In the step of generating the sea clutter map, the sea clutter map may be completed for each elevation angle (S38) by repeating until the maximum elevation angle set to the maximum elevation angle threshold (S36).

Figure 14:
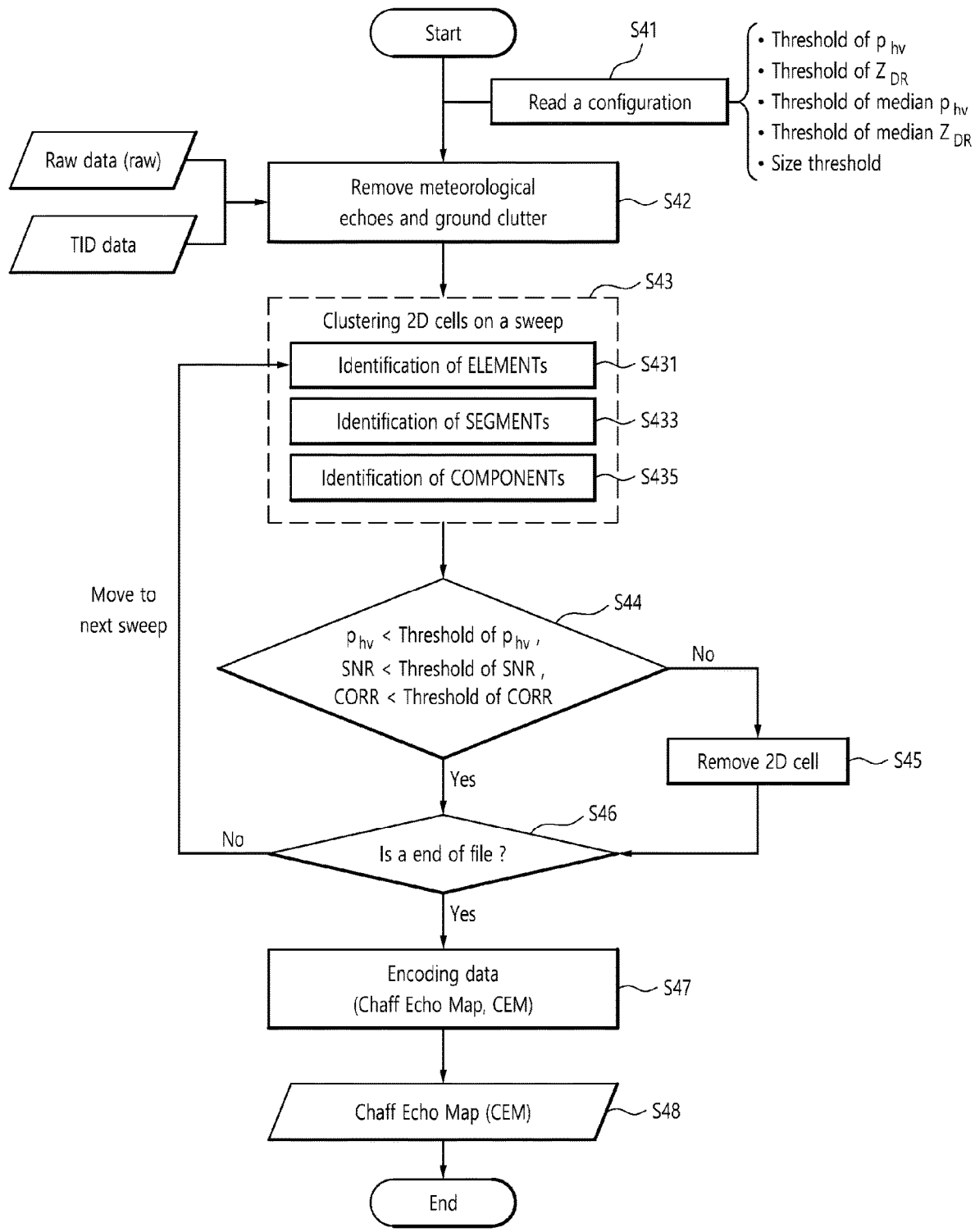
FIG. 14 is a detailed flowchart of S40 in FIG. 11.

FIG. 14 is a detailed flowchart of the step S40 of FIG. 11.

Referring to FIG. 14, in the step of distinguishing the chaff echo, thresholds for necessary variables are set (S41), and meteorological echoes and ground clutter are removed from the raw radar data using an echo type classification (TID) result (S42).

A 2D object is identified based on the 2D cell clustering scheme in the polar coordinate system where the meteorological echo and ground clutter are removed (S43). Subsequently, when the preset variables of each identified 2D object are smaller than the corresponding thresholds (S44), it is determined as chaff echo (chaff 2D) (S48) through data encoding (S47).

In the step of distinguishing the chaff echo, the Chaff Echo Map (CEM) is completed for each elevation angle by repeating all over the elevation angle (S46).

In this process, when the area of the identified 2D object is smaller than the threshold, it is regarded as noise and removed, and when the preset variables of each identified object are equal to or larger than the corresponding thresholds, it may be regarded as noise and removed (S45). Here, the variables may include $\rho_{hv}$, SNR and CORR, and any other variable may be used.

Specifically, the step of identifying the 2D object may include (S431) distinguishing radar gates (grid points) according to the preset thresholds in each elevation angle data of the polar coordinate system and assigning an individual number to define elements, (S433) defining continuous elements within a preset range in the radial direction as identical segments, and (S435) defining continuous segments within a preset range in the azimuthal direction as components which are the 2D object.

Among the components, the 2D object satisfying the conditions is distinguished as chaff echo, and its description was made together with FIG. 4.

Figure 15:
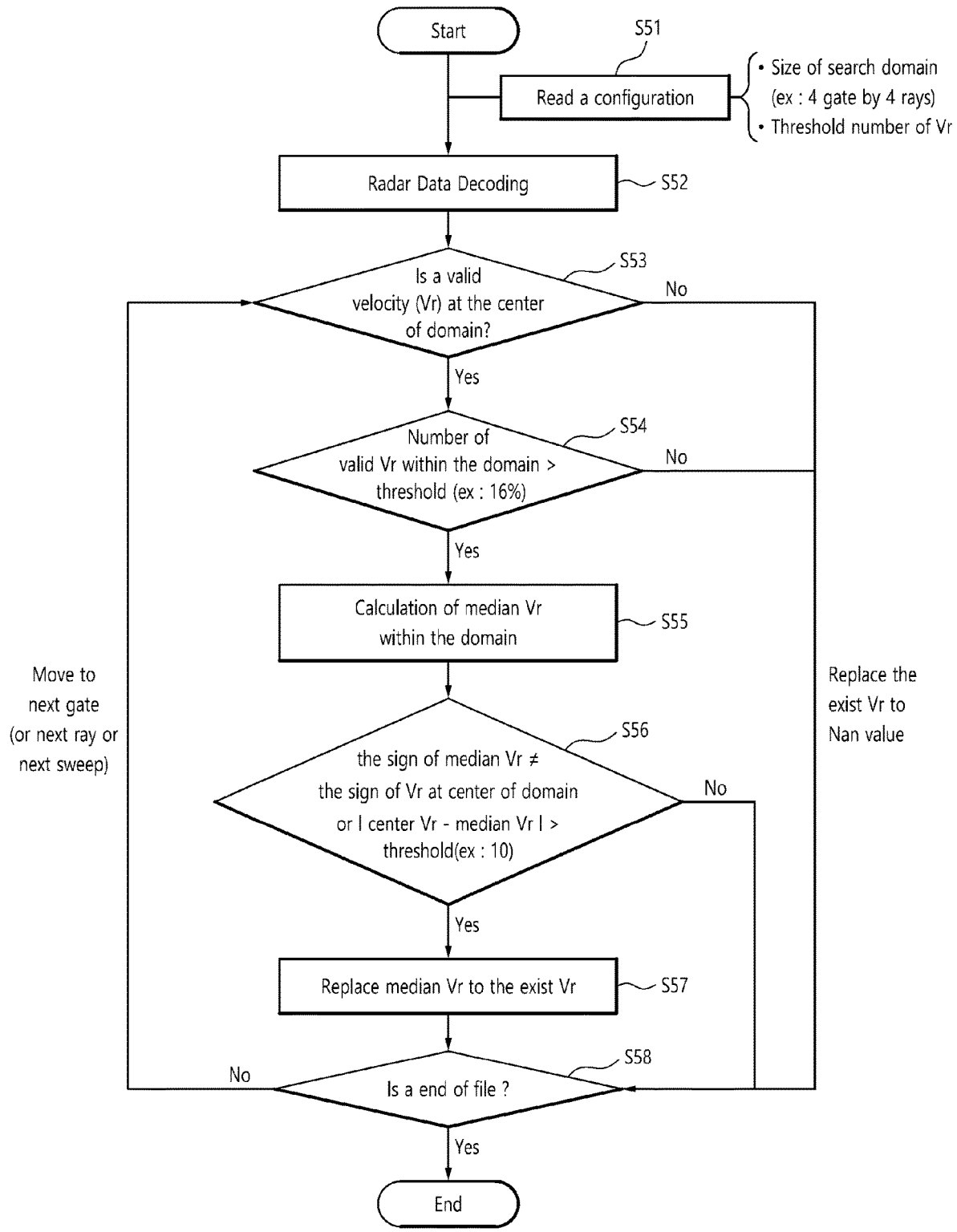
FIG. 15 is a detailed flowchart of S2 in FIG. 11.

FIG. 15 is a detailed flowchart of the step S2 of FIG. 11.

Referring to FIG. 15, in the step of correcting the radial velocity, first, a window size and a valid radial velocity ratio threshold are set with respect to the expanded radial velocity area (S51).

After a data decoding process is performed (S52), determination is made as to whether window center radial velocity is valid (S53). When the window center radial velocity is valid, and the ratio of valid radial velocity in the window is larger than the threshold (for example, 16%) (S54), the median is calculated from radial velocities except the window center radial velocity (S55).

When the sign of the window center radial velocity is unequal to the sign of the median or when the sign of the window center radial velocity is equal to the sign of the median but its difference is larger than the threshold (S56), the window center radial velocity is determined as noise and removed, and the removed window center radial velocity is replaced with the median to recover it (S58).

This process is applied to all files (S58), and when the window center radial velocity is invalid or when the ratio of the number of valid radial velocities in the window is equal to or smaller than the threshold, the window center radial velocity is processed as an invalid value. Its description was made together with FIGS. 6 and 7.

Figure 16:
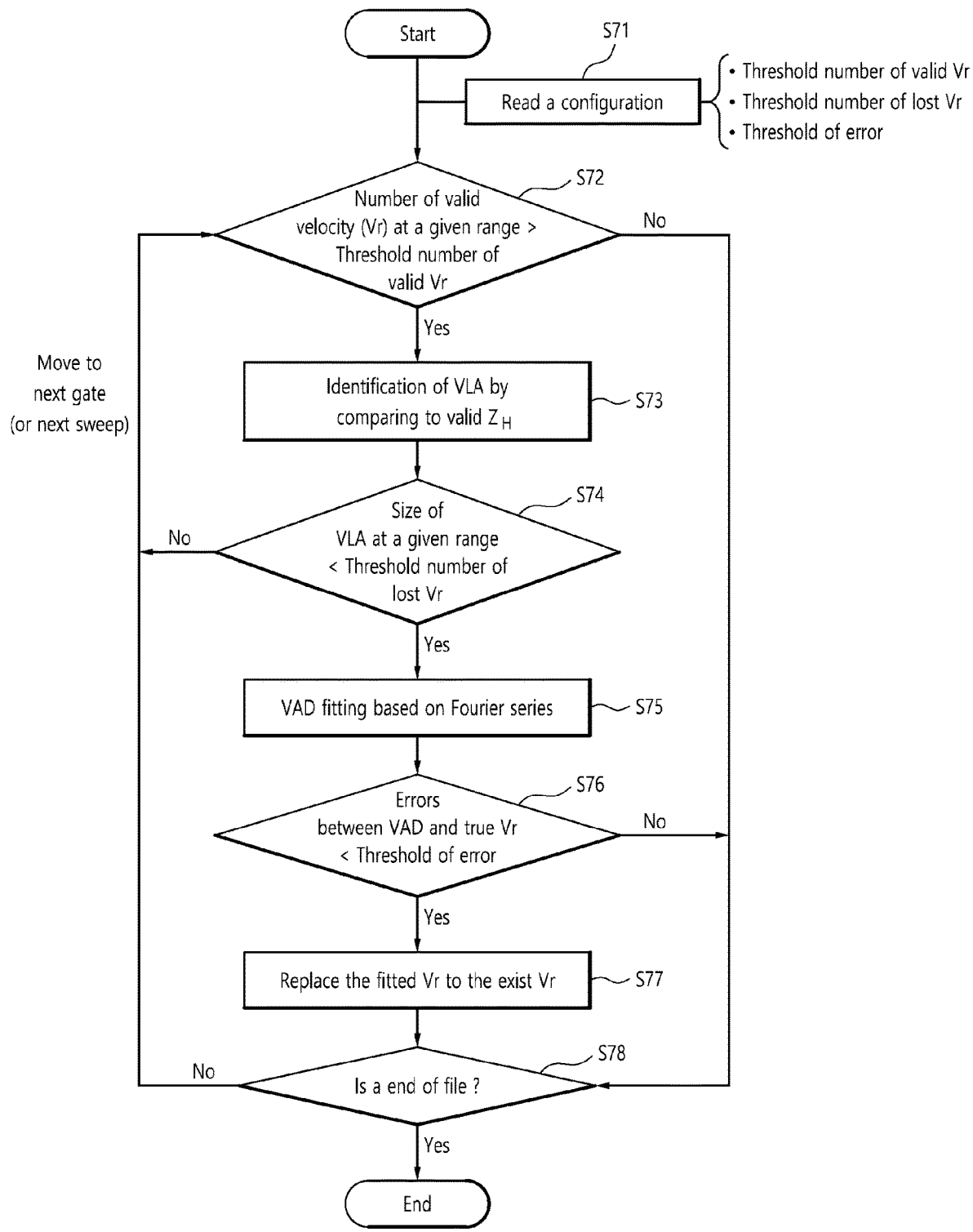
FIG. 16 is a detailed flowchart of S3 in FIG. 11.

FIG. 16 is a detailed flowchart of the step S3 of FIG. 11.

Referring to FIG. 16, in the step of distinguishing the lost radial velocity area, first, threshold number of valid radial velocities, threshold number of lost radial velocities relative to reflectivity and an error threshold are set (S71).

When the number of valid radial velocities in a preset range is larger than the threshold (S72), a Velocity Loss Area (VLA) relative to reflectivity is identified (S73). Here, the error is a difference between the VAD curve and the real radial velocity value.

In the step of retrieving the lost radial velocity, when the size of the VLA is smaller than the threshold (S74), VAD curve fitting is performed for each azimuth angle based on the real radial velocity and a Fourier series (S75).

When a difference between a value of the VAD curve and the real radial velocity value is smaller than the error threshold at each azimuth angle (S76), lost radial velocity is retrieved along the VAD curve (S77). This process is performed over all files (S78).

Its detailed description was made together with Equations 1 to 10. Additionally, FIGS. 9 and 10 show an example of retrieval of lost radial velocity using the velocity loss area at the azimuth angle of 70° and about 260° (indicated by the boxes) and VAD curve (a solid line) fitting.

According to the method for retrieval of lost radial velocity in weather radar, it is possible to improve the accuracy of 3D wind fields using radar radial velocity by removing radial velocity noise.

Additionally, it is possible to expand the wind field calculation area using radial velocities of echoes (sea clutter, chaff echo) that have not been used before and calculate radar wind fields more similar to real winds such as strong winds in typhoons.

Through this, it is possible to calculate more accurate wind fields through radial velocity quality control, and can be used to prevent meteorological disasters through early detection of hazardous weather and rapid response.

The method for retrieval of lost radial velocity in weather radar may be implemented in the form of applications or program instructions that can be executed through a variety of computer components, and recorded in computer-readable recording media. The computer-readable recording media may include program instructions, data files and data structures, alone or in combination.

The program instructions recorded in the computer-readable recording media may be specially designed and configured for the present disclosure and may be those known and available to persons having ordinary skill in the field of computer software.

Examples of the computer-readable recording media include hardware devices specially designed to store and execute the program instructions, for example, magnetic media such as hard disk, floppy disk and magnetic tape, optical media such as CD-ROM and DVD, magneto-optical media such as floptical disk, and ROM, RAM and flash memory.

Examples of the program instructions include machine code generated by a compiler as well as high-level language code that can be executed by a computer using an interpreter. The hardware device may be configured to act as one or more software modules to perform the processing according to the present disclosure, and vice versa.

While the present disclosure has been hereinabove described with reference to the embodiments, those skilled in the art will understand that various modifications and changes may be made thereto without departing from the spirit and scope of the present disclosure defined in the appended claims.

The present disclosure can be used to prevent meteorological disasters through early detection of hazardous weather and rapid response by calculating more accurate wind fields through radial velocity quality control. Additionally, it is possible to contribute to the guarantee of safety in aeronautical meteorology through detection of hazardous weather (downburst, turbulence, shear) elements during takeoff and landing of aircraft, and can be advantageously used in the field of meteorological disaster response through prediction of strong wind areas on the ground and roads and strong wind prediction in the event of typhoons.

DETAILED DESCRIPTION OF MAIN ELEMENTS

10: Device for retrieval of lost radial velocity in weather radar
100: Area expansion unit
300: Radial velocity correction unit
500: Area distinguishing unit
700: Radial velocity retrieval unit
110: Sea clutter unit
130: Chaff echo unit
150: Area recovery unit
131: Element unit
133: Segment unit
135: Component unit
137: Noise cancellation unit
310: Threshold setting unit
330: Validity determination unit
350: Median calculation unit
370: Noise removal unit
390: Median replacement unit
510: Characteristics configuration unit
530: VLA identification unit
710: VAD curve fitting unit
730: Radial velocity replacement unit

What is claimed is:

1. A computer-implemented method for retrieval of lost radial velocity in weather radar, the method comprising:
   expanding a radial velocity area to non-meteorological echoes including sea clutter and chaff echo using raw radar data for use of a wind field calculation area;
   correcting a radial velocity by replacing the radial velocity determined as noise using a median sign comparison method with a median calculated within a window to which the radial velocity belongs;
   distinguishing a lost radial velocity area by comparing the corrected radial velocity with radar reflectivity data;
   retrieving a lost radial velocity using a Velocity Azimuth Display (VAD) fit function representing radial velocity of precipitation particles observed along a radar radiation source at a certain elevation in the lost radial velocity area as a function of an azimuth angle; and
   calculating wind fields based on the retrieved lost radial velocity, and using the calculated wind fields in detection of hazardous weather and rapid response.

2. The method of claim 1, wherein the expanding the radial velocity area to the non-meteorological echoes comprises:
   generating a Sea Clutter Map (SCM) using Frequency Of Reflectivity (FOR) of the raw radar data;
   distinguishing the chaff echo based on a 2-dimensional object recognition scheme from the raw radar data; and
   recovering the sea clutter and the chaff echo to non-meteorological echo removed radar data.

3. The method of claim 2, wherein the generating the SCM comprises:
   setting a frequency of reflectivity threshold and a maximum elevation angle threshold for sea clutter observation;
   collecting frequency of reflectivity data which is an accumulation of reflectivity observed for a day or longer for each elevation angle;
   overlapping the frequency of reflectivity data with terrain data when a frequency of reflectivity is larger than the frequency of reflectivity threshold for the each elevation angle; and
   determining as the sea clutter when the frequency of reflectivity data and the terrain data do not overlap.

4. The method of claim 3, wherein the generating the SCM further comprises completing the SCM for the each elevation angle by repeating up to a maximum elevation angle set by the maximum elevation angle threshold.

5. The method of claim 2, wherein the distinguishing the chaff echo comprises:
   removing meteorological echoes and ground clutter from the raw radar data using an echo type classification (TID) result;
   identifying a 2-dimensional (2D) object based on a 2D cell clustering scheme in a polar coordinate system where the meteorological echoes and the ground clutter are removed; and
   determining as the chaff echo (chaff 2D) when preset variables of each identified 2D object are smaller than corresponding thresholds.

6. The method of claim 5, wherein the determining as the chaff echo further comprises completing a Chaff Echo Map (CEM) for each elevation angle by repeating for all of the elevation angles.

7. The method of claim 5, wherein the distinguishing the chaff echo further comprises:
   regarding as noise and removing when an area of the identified 2D object is smaller than a threshold; and
   regarding as noise and removing when the preset variables of the each identified 2D object are equal to or larger than the corresponding thresholds.

8. The method of claim 5, wherein the identifying the 2D object comprises:
   distinguishing radar gates (grid points) based on preset thresholds in each elevation angle data of the polar coordinate system, and assigning an individual number to define elements;
   defining consecutive elements within a preset range in a radial direction as identical segments; and
   defining consecutive segments within a preset range in an azimuthal direction as components which are the 2D object.

9. The method of claim 1, wherein the correcting the radial velocity comprises:
   setting a window size and a threshold for a valid radial velocity ratio with respect to the expanded radial velocity area;
   determining if the radial velocity at a center of the window is valid;
   calculating the median from radial velocities except the window center radial velocity, when the radial velocity at the center of the window is valid or when the valid radial velocity ratio in the window is larger than the threshold;
   determining the radial velocity at the center of the window as noise and removing when a sign of the radial velocity at the center of the window is not same as a sign of the median or when the sign of the radial velocity at the center of the window is same as the sign of the median but a difference therebetween is larger than the threshold; and recovering by replacing the removed radial velocity at the center of the window with the median.

10. The method of claim 9, wherein the correcting the radial velocity further comprises processing the radial velocity at the center of the window as an invalid value when the radial velocity at the center of the window is invalid or when the valid radial velocity ratio in the window is equal to or smaller than the threshold.

11. The method of claim 1, wherein the distinguishing the lost radial velocity area comprises:
setting a threshold for a number of valid radial velocities, a threshold for a number of lost radial velocities relative to reflectivity, and a threshold for error; and
identifying the lost radial velocity area (Velocity Loss Area (VLA)) relative to reflectivity when the number of valid radial velocities in a preset range is larger than the threshold.

12. The method of claim 11, wherein the error is a difference between a VAD curve and a real radial velocity value.

13. The method of claim 11, wherein the retrieving the lost radial velocity comprises:
performing VAD curve fitting based on a real radial velocity and a Fourier series for each azimuth angle when a size of the VLA is smaller than the threshold; and
retrieving the lost radial velocity along a VAD curve when a difference between a value of the VAD curve and a value of the real radial velocity is smaller than the threshold for the error at each azimuth angle.

14. A non-transitory computer-readable storage medium having recorded thereon a computer program for performing a method for retrieval of lost radial velocity in weather radar, the method comprising:
expanding a radial velocity area to non-meteorological echoes including sea clutter and chaff echo using raw radar data for use of a wind field calculation area;
correcting a radial velocity by replacing the radial velocity determined as noise using a median sign comparison method with a median calculated within a window to which the radial velocity belongs;
distinguishing a lost radial velocity area by comparing the corrected radial velocity with radar reflectivity data;
retrieving a lost radial velocity using a Velocity Azimuth Display (VAD) fit function representing radial velocity of precipitation particles observed along a radar radiation source at a certain elevation in the lost radial velocity area as a function of an azimuth angle; and
calculating wind fields based on the retrieved lost radial velocity, and using the calculating wind fields in detection of hazardous weather and rapid response.

15. A device for retrieval of lost radial velocity in weather radar, the device comprising:
an area expansion unit expanding a radial velocity area to non-meteorological echoes including sea clutter and chaff echo using raw radar data for use of a wind field calculation area;
a radial velocity correction unit correcting a radial velocity by replacing the radial velocity determined as noise using a median sign comparison method with a median calculated within a window to which the radial velocity belongs;
an area distinguishing unit distinguishing a lost radial velocity area by comparing the corrected radial velocity with radar reflectivity data;
a radial velocity retrieval unit retrieving a lost radial velocity using a Velocity Azimuth Display (VAD) fit function representing radial velocity of precipitation particles observed along a radar radiation source at a certain elevation in the lost radial velocity area as a function of an azimuth angle; and
a unit calculating wind fields based on the retrieved lost radial velocity, and using the calculated wind fields in detection of hazardous weather and rapid response.

16. The device of claim 15, wherein the area expansion unit comprises:
a sea clutter unit generating a Sea Clutter Map (SCM) using Frequency Of Reflectivity (FOR) of the raw radar data;
a chaff echo unit determining the chaff echo based on a 2-dimensional (2D) object recognition scheme from the raw radar data; and
an area recovery unit recovering the sea clutter and the chaff echo to non-meteorological echo removed radar data.

17. The device of claim 16, wherein the chaff echo unit comprises:
an element unit distinguishing radar gates (grid points) based on preset thresholds in each elevation angle data of a polar coordinate system and assigning an individual number to define elements;
a segment unit defining consecutive elements within a preset range in a radial direction as identical segments;
a component unit defining consecutive segments within a preset range in an azimuthal direction as components which are a 2-dimensional (2D) object; and
a noise cancelation unit regarding as noise and removing when preset variables of each 2D object are equal to or larger than corresponding thresholds.

18. The device of claim 15, wherein the radial velocity correction unit comprises:
a threshold setting unit setting a window size and a threshold for a valid radial velocity ratio with respect to the expanded radial velocity area;
a validity determination unit determining if the radial velocity at a center of the window is valid, and processing the radial velocity at the center of the window as an invalid value when the radial velocity at the center of the window is invalid;
a median calculation unit calculating the median in radial velocities except the radial velocity at the center of the window, when the radial velocity at the center of the window is valid or when the valid radial velocity ratio in the window is larger than the threshold;
a noise removal unit determining the radial velocity at the center of the window as noise and removing when a sign of the radial velocity at the center of the window is not same as a sign of the median or when the sign of the radial velocity at the center of the window is same as the sign of the median but a difference therebetween is larger than the threshold, and processing the radial velocity at the center of the window as an invalid value when the valid radial velocity ratio in the window is equal to or smaller than the threshold; and
a median replacement unit recovering by replacing the removed radial velocity at the center of the window with the median.

19. The device of claim 15, wherein the area distinguishing unit comprises:
a characteristics configuration unit setting a threshold for a number of valid radial velocities, a threshold for a number of lost radial velocities relative to reflectivity, and a threshold for an error, wherein the error is a difference between a VAD curve and a real radial velocity value; and a Velocity Loss Area (VLA) identification unit identifying the lost radial velocity area (VLA) relative to reflectivity when the number of valid radial velocities in a preset range is larger than the threshold.

20. The device of claim 19, wherein the radial velocity retrieval unit comprises:

a VAD curve fitting unit performing VAD curve fitting based on a real radial velocity and a Fourier series for each azimuth angle when a size of the VLA is smaller than the threshold; and a radial velocity replacement unit retrieving the lost radial velocity along the VAD curve when a difference between a value of the VAD curve and a value of the real radial velocity is smaller than the threshold for the error at each azimuth angle.

\* \* \* \* \*